(12) United States Patent
Sato

(10) Patent No.: US 7,940,482 B2
(45) Date of Patent: May 10, 2011

(54) LENS DRIVE APPARATUS AND IMAGE PICKUP APPARATUS INCLUDING LENS DRIVE APPARATUS

(75) Inventor: Koji Sato, Fukushima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/470,398

(22) Filed: May 21, 2009

(65) Prior Publication Data

US 2009/0296241 A1     Dec. 3, 2009

(30) Foreign Application Priority Data

May 28, 2008   (JP) .................................. 2008-139166

(51) Int. Cl.
 *G02B 7/02* (2006.01)
(52) U.S. Cl. .......................... 359/824; 359/822; 396/133
(58) Field of Classification Search .......... 359/819–824; 310/12.04; 348/208.1, 208.5; 396/133
See application file for complete search history.

(56) References Cited

U.S. PATENT DOCUMENTS

| 5,199,014 A * | 3/1993 | Homburg et al. .......... 369/44.15 |
| 5,305,151 A * | 4/1994 | Kakimoto et al. ............ 359/814 |
| 2008/0069554 A1 * | 3/2008 | Huang .......................... 396/133 |
| 2009/0195087 A1 * | 8/2009 | Kurosawa .................. 310/12.17 |

FOREIGN PATENT DOCUMENTS

JP          2002-169073 A      6/2002

* cited by examiner

*Primary Examiner* — Darryl J Collins
(74) *Attorney, Agent, or Firm* — Canon USA Inc IP Division

(57) ABSTRACT

A lens drive apparatus that can prevent a propulsion force generated in a direction other than an optical axis direction without a second yoke, reduce a size of the entire apparatus, and high-accurately drive a lens holding frame in the optical axis direction. The apparatus including: a member to be driven that holds a lens, is movable in the optical axis direction, and is guided and supported in a lens barrel; a movable coil wound with at least two sides in parallel to the optical axis direction, and mounted to a part of the member to be driven; and a magnet placed to face the movable coil in parallel to the optical axis direction, and provided in the lens barrel, wherein the movable coil is configured so that at least one side of the two sides and one side other than the two sides face surfaces of the magnet.

5 Claims, 4 Drawing Sheets

LENS DRIVE APPARATUS AND IMAGE PICKUP APPARATUS INCLUDING LENS DRIVE APPARATUS

BACKGROUND OF THE INVENTION

1. Field of the Invention

The present invention relates to a lens drive apparatus which is suitable for, for example, an image pickup apparatus such as a video camera or a digital camera which can drive a movable lens frame movable in an optical axis direction in a lens barrel with high accuracy.

2. Description of the Related Art

A lens barrel of an image pickup apparatus such as a video camera having an automatic focusing function or a power zoom function generally includes a lens drive apparatus for moving a focusing or zooming movable lens frame in an optical axis direction.

A conventionally known drive unit in this case includes, for example, a lens drive apparatus using an electromagnetic drive actuator including a coil and a magnet, that is, an electromagnetic drive apparatus (Japanese Patent Application Laid-Open No. 2002-169073).

FIG. 6 is an exploded perspective view of an electromagnetic drive apparatus for driving a focus lens in an optical axis direction disclosed in Japanese Patent Application Laid-Open No. 2002-169073.

The electromagnetic drive apparatus in FIG. 6 includes a magnet 102 fixedly supported by an unshown fixed outer barrel member, a movable lens frame 104 driven slidably in the optical axis direction, and a coil (movable coil) 103 fixedly supported by the movable lens frame 104.

Areas 102A and 102B that constitute the magnet 102 have magnetic poles magnetized oppositely in parallel. In a configuration of the electromagnetic drive apparatus in FIG. 6, a first yoke 101 and a second yoke 105 made of magnetic material draw opposite magnetic fluxes of the areas 102A and 102B generated by the magnet 102, and a vertical magnetic field can be provided to the coil 103.

Electromagnetic driving by the coil 103 and the magnet 102 will be described below.

The magnet 102 has a magnetic flux density of the areas 102A and 102B magnetized oppositely in parallel, while the coil 103 generates a magnetic field according to a current flow direction.

The magnetic flux of the magnet 102 passing through the coil 103 is desirably substantially perpendicular to an optical axis direction.

The magnetic field generated by applying a current to the coil 103 and the magnetic field generated by the magnet 102 produce thrust for driving in the optical axis direction (Fleming's left-hand rule).

The movable lens frame 104 integrated with the coil 103 is moved in the optical axis direction by the thrust.

In FIG. 6, a sleeve 104A is provided in the member to be driven 104. A bifurcated hook arm 104C is provided on a lower side of the member to be driven 104.

The electromagnetic drive apparatus having the configuration in FIG. 6 has a superior driving property. In FIG. 6, the second yoke 105 is placed to face the magnet 102 so as to hold the coil 103 therebetween as its function.

Thus, as shown in FIG. 6, the coil 103 is significantly spaced from the movable lens frame 104 perpendicularly to the optical axis, and the second yoke 105 is passed through the space. In the configuration in FIG. 6, the second yoke 105 is used and thus the entire electromagnetic drive apparatus tends to be increased in size.

FIG. 7 illustrates a driving property of the electromagnetic drive apparatus with the second yoke 105 being omitted in the electromagnetic drive apparatus in FIG. 6.

The electromagnetic drive apparatus in FIG. 7 does not include the second yoke 105 for drawing the magnetic flux generated by the magnet 102. Thus, the magnetic flux passing through the coil 103 does not form a vertical magnetic field as shown in FIG. 7, and thus a propulsion force is generated in a direction other than the optical axis direction indicated by an arrow MO according to a direction of a current flow through the coil 103.

The propulsion force generated in the direction other than the optical axis direction may prevent driving the movable lens frame 104 in the optical axis direction. The propulsion force may also lift the movable lens frame 104 when a driving direction is reversed. This may cause blur of picked-up images or generates abnormal noise.

The present invention has an object to provide a lens drive apparatus and an image pickup apparatus including the lens drive apparatus that can prevent a propulsion force generated in a direction other than an optical axis direction without a second yoke, reduce a size of the entire apparatus, and drive a lens holding frame in the optical axis direction with high accuracy.

SUMMARY OF THE INVENTION

The present invention provides a lens drive apparatus including: a member to be driven that holds a lens, can be moved in an optical axis direction, and is guided and supported in a lens barrel; a movable coil wound with at least two sides in parallel with the optical axis direction, and mounted to a part of the member to be driven; and a magnet placed to face the movable coil in parallel with the optical axis direction, and provided in a part of the lens barrel, wherein the movable coil is configured so that at least one side of the two sides and one side other than the two sides face surfaces of the magnet.

The present invention provides a lens drive apparatus and an image pickup apparatus including the lens drive apparatus that can prevent a propulsion force generated in a direction other than an optical axis direction without a second yoke, reduce a size of the entire apparatus, and drive a lens holding frame in the optical axis direction with high accuracy.

Further features of the present invention will become apparent from the following description of exemplary embodiments with reference to the attached drawings.

DESCRIPTION OF THE EMBODIMENTS

A lens drive apparatus of the present invention includes a member to be driven (lens holding frame) that holds a lens for zooming or focusing, can be moved in an optical axis direction, and is guided and supported in a lens barrel.

The lens drive apparatus further includes a movable coil wound with at least two sides in parallel with the optical axis direction, and mounted to a part of the member to be driven and integrally driven.

The lens drive apparatus further includes a magnet placed to face the movable coil in parallel with the optical axis direction, and provided in a part of the lens barrel with different magnetic poles being magnetized in parallel.

At least one side of the two sides of the movable coil is deformed, and the movable coil is formed to face different surfaces that constitute the magnet when one side other than the two sides of the movable coil is housed and held in the lens barrel.

Particularly, the movable coil is placed so that at least two sides are in parallel with different magnetic pole surfaces placed in parallel on the magnet. At least one side other than the two sides is placed close to a surface of the magnet other than the surfaces placed in parallel.

Thus, a satisfactory lens drive apparatus is achieved without a second yoke for causing a magnetic flux generated by the magnet to form a vertical magnetic field.

Embodiments

Next, an embodiment will be described in which a lens drive apparatus of the present invention is applied to a lens drive apparatus (electromagnetic drive apparatus) for driving a focus lens of an inner focus unit included in an image pickup apparatus such as a digital camera or a video camera.

Figure 1:
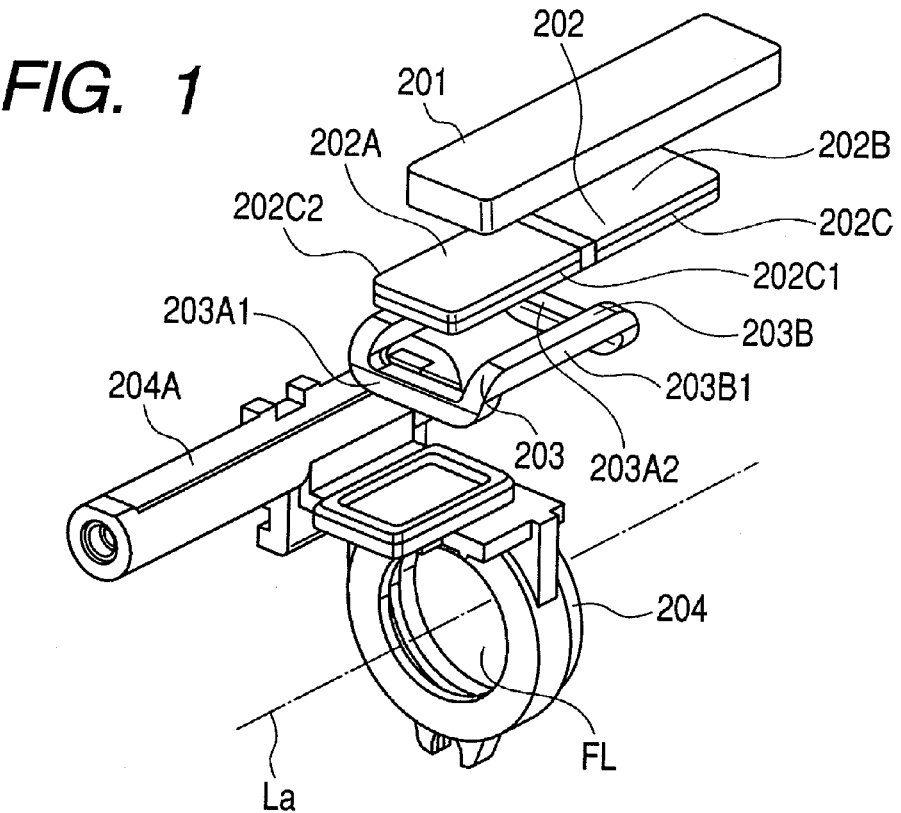
FIG. 1 is an exploded perspective view of essential parts of Embodiment 1 of the present invention.
Figure 2:
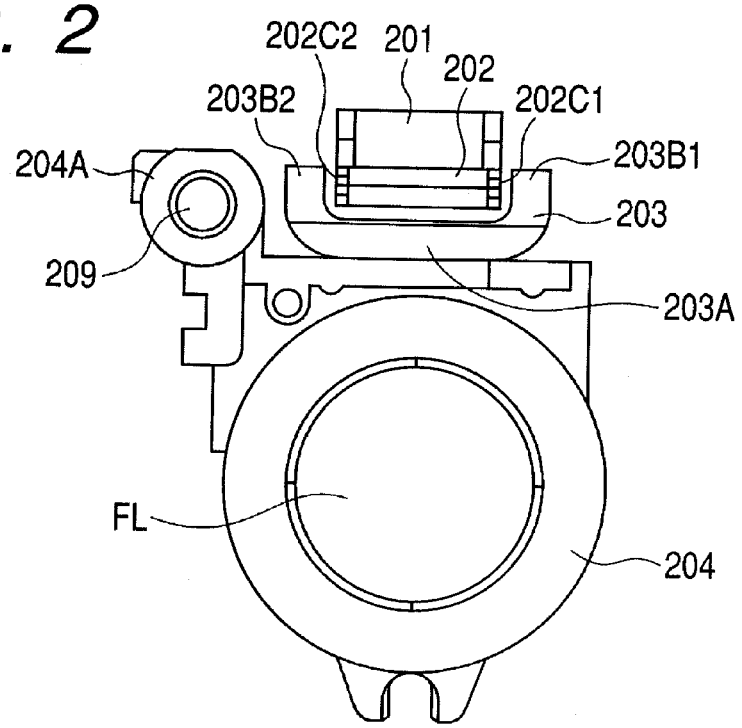
FIG. 2 is a front view of essential parts of Embodiment 1 of the present invention.

FIGS. 1 and 2 are an exploded perspective view and a schematic front view of essential parts of a lens drive apparatus of Embodiment 1.

A member to be driven (lens holding frame) 204 holding a focusing lens FL includes a sleeve 204A, and is guided and supported by a bar 209 inserted through the sleeve 204A in a direction of an optical axis La without bumping. The member to be driven 204 is also prevented from rotating by a bar (not shown) inserted through a recess on the other side of the sleeve 204A to fix the optical axis.

The member to be driven 204 holds a movable coil 203 in an area on a lower side (upper side in FIGS. 1 and 2) of the optical axis La in a state of use. Specifically, the member to be driven 204 and the movable coil 203 are integrally configured.

The movable coil 203 can be moved in the direction of the optical axis La, and is a wounded coil.

Sides 203B1 and 203B2 of the movable coil 203 are parallel to the optical axis direction.

A first yoke 201 is magnetically held by the magnet 202.

The first yoke 201 and the movable coil 203 hold the magnet 202 therebetween.

The magnet 202 has a flat plate shape including two areas 202A and 202B parallel to the optical axis direction, magnetized oppositely and placed adjacent to each other, and is provided in a part of a lens barrel to face the movable coil 203.

In the above described configuration, when a current flows through the movable coil 203, a drive force for movement in the direction of the optical axis La is generated in the movable coil 203 itself by interference with a magnetic flux generated by the magnet 202, and the member to be driven 204 is integrally moved by the drive force.

A position detecting magnet (not shown) is provided in a part of the sleeve 204A of the member to be driven 204. A magnetoresistance effect element (not shown) is provided in a part of a lens barrel (not shown) within a range in the optical axis direction where the position detecting magnet is moved.

The position of the member to be driven 204 in the direction of the optical axis La is detected by the position detecting magnet and the magnetoresistance effect element.

The movable coil 203 is at least partially deformed so as to face at least one of different surfaces (side surfaces parallel to the optical axis direction) 202C1 and 202C2 of the magnet 202. Two areas 203A1 and 203A2 (203A) of the movable coil 203 which are located in a fore/aft direction of the optical axis are placed to span both areas 202A and 202B of the magnet 202 which are located in the fore/aft direction of the optical axis. A current flows through the movable coil 203 produces main drive thrust for moving the movable coil 203 in the optical axis direction.

Two areas 203B1 and 203B2 (203B) of the movable coil 203 are placed to face side surfaces 202C1 and 202C2 (202C) of the magnet 202.

Figure 3:
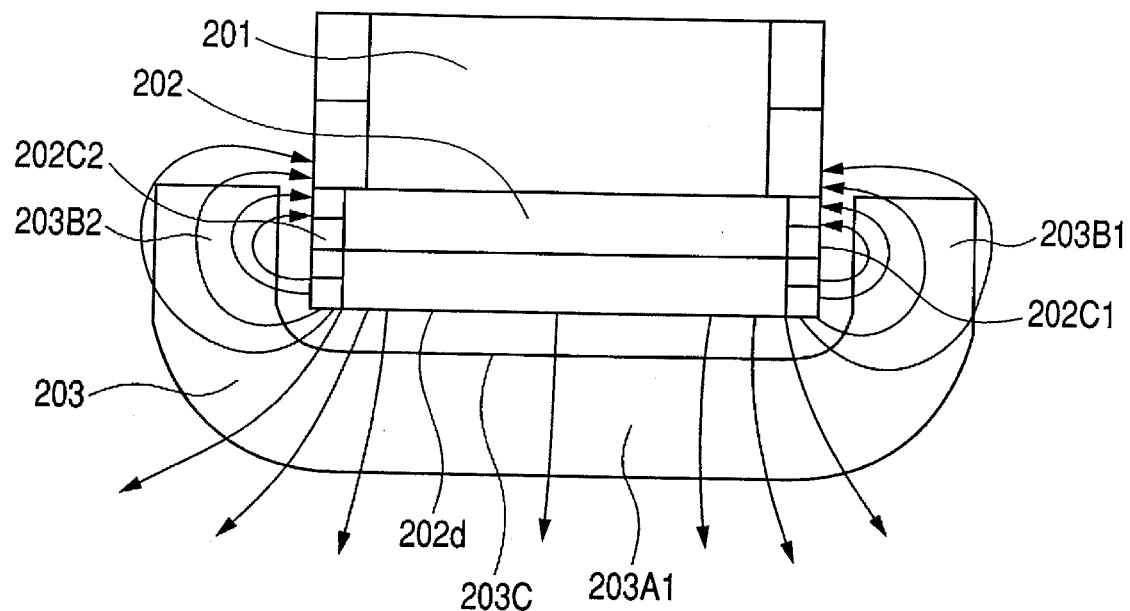
FIG. 3 illustrates generation of a magnetic field in Embodiment 1 of the present invention.

FIG. 3 illustrates a positional relationship between the magnet 202 and the movable coil 203. As shown in FIG. 3, at least one part of the wounded shape of the movable coil 203 is deformed. The movable coil 203 is formed to face at least two surfaces (for example, surfaces 202C1 and 202d, or surfaces 202C1 and 202C2) of a plurality of surfaces of the magnet 202.

In FIG. 3, the movable coil 203 has three sides 203B1, 203B2 and 203C facing three surfaces (202C1, 202C2 and 202d) of the magnet 202.

As shown in FIG. 3, a radial magnetic field is generated from the side surfaces 202C1 and 202C2 (202C) of the magnet 202, and the areas 203B1 and 203B2 (203B) in the movable coil 203 are located in the radial magnetic field.

Figure 4:
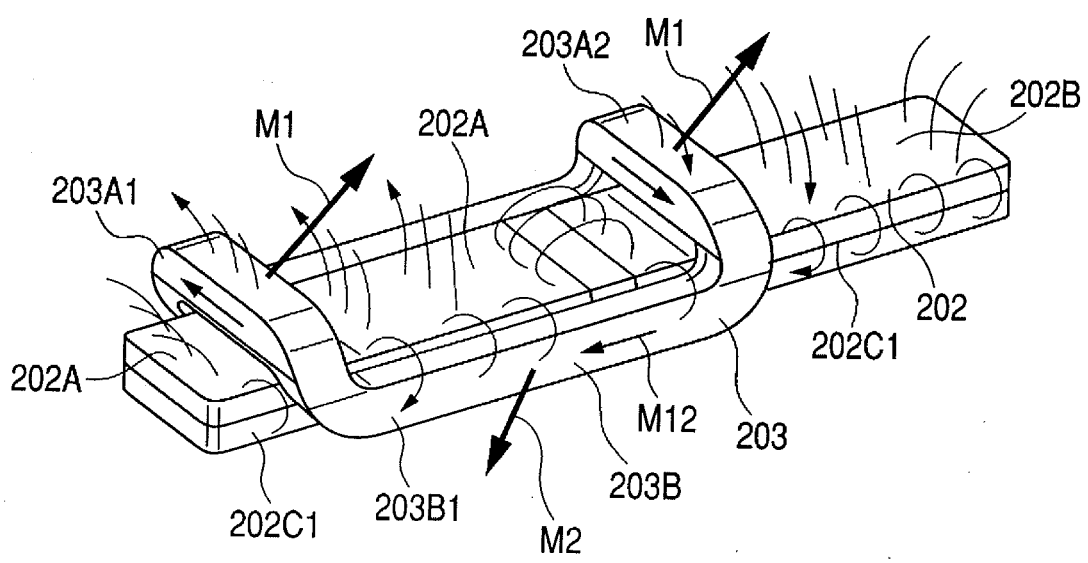
FIG. 4 illustrates a propulsion force in Embodiment 1 of the present invention.

FIG. 4 illustrates a propulsion force generated when a positive current flows through the movable coil 203.

As shown in FIG. 4, the areas 203A1 and 203A2 (203A) in the movable coil 203 attract each other by the radial magnetic field generated by the magnet 202 and a magnetic field generated by the positive current flow through the movable coil 203. The attraction of the magnetic fields generates a propulsion force for driving in a front upper direction of an arrow M1 in FIG. 4.

On the other hand, as shown in FIG. 4, the areas 203B1 and 203B2 (203B) in the movable coil 203 attract each other by the radial magnetic field generated by the side surfaces 202C1 and 202C2 (202C) of the magnet 202 and the magnetic field generated by the positive current flow through the movable coil 203. The attraction of the magnetic fields generates a propulsion force for driving in a left lower direction of an arrow M2 in FIG. 4. Thus, the movable coil 203 is moved in a direction of an arrow M12.

Figure 5:
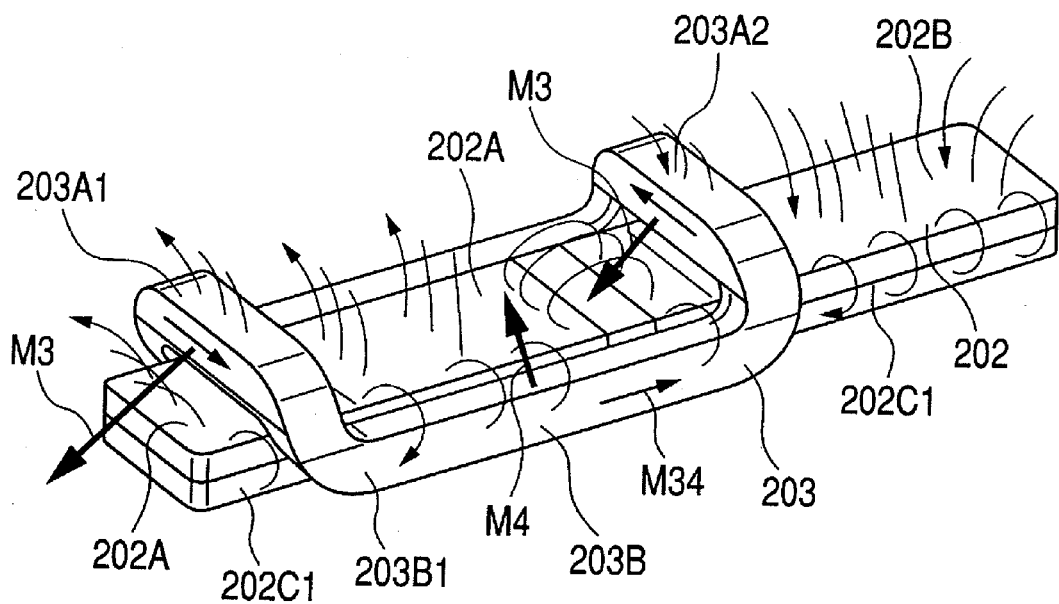
FIG. 5 illustrates a propulsion force in Embodiment 1 of the present invention.
Figure 6:
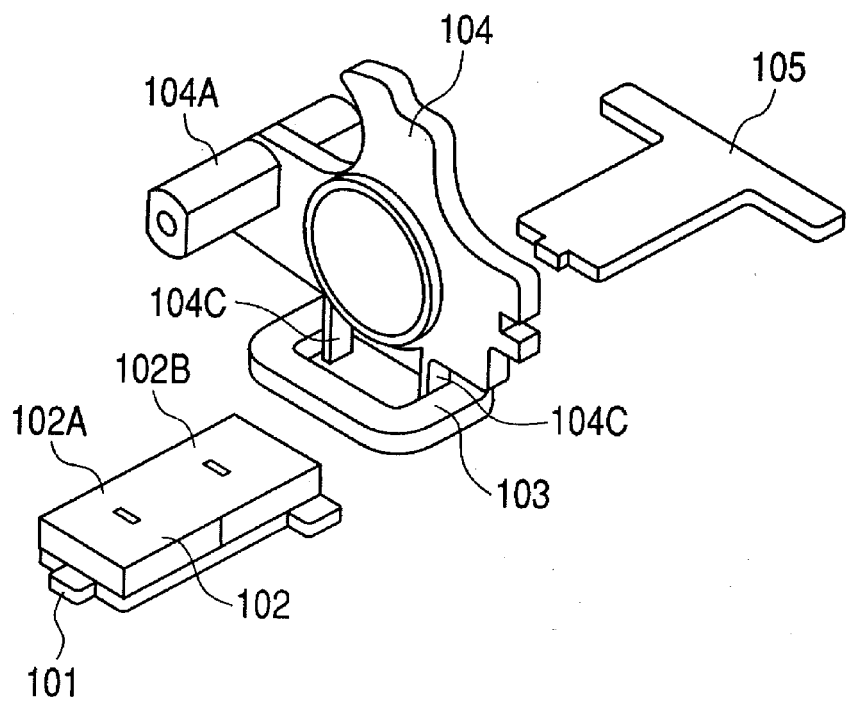
FIG. 6 is an exploded perspective view of essential parts of a conventional lens drive apparatus.
Figure 7:
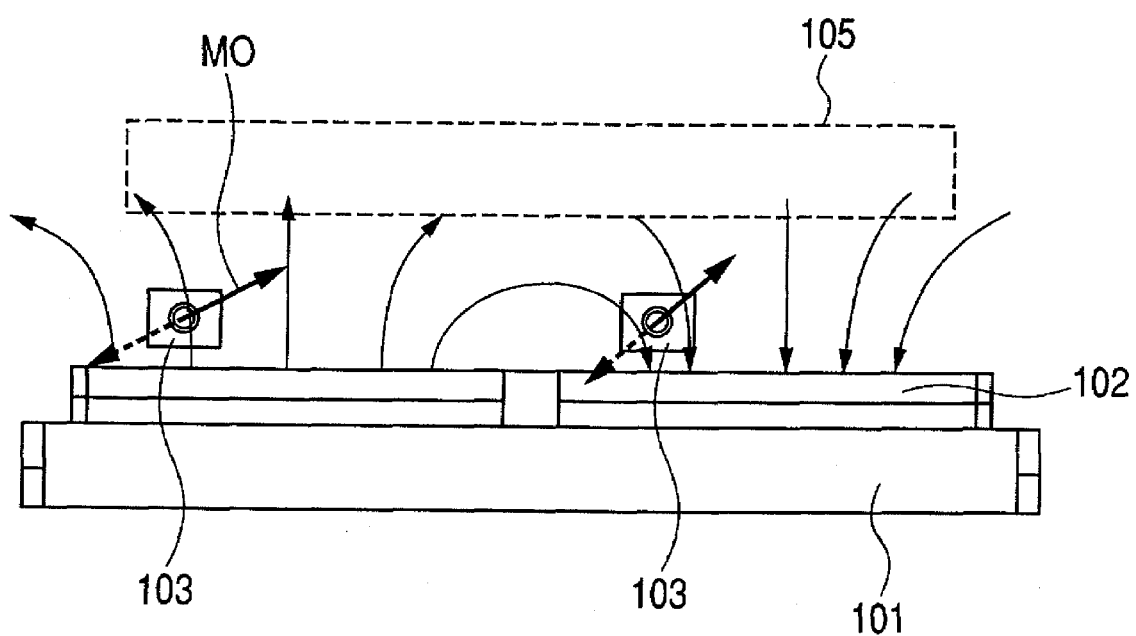
FIG. 7 illustrates a part of FIG. 6.

FIG. 5 illustrates a propulsion force generated when a current flows through the movable coil 203 in a direction opposite to the case shown in FIG. 4.

As shown in FIG. 5, the areas 203A1 and 203A2 (203A) in the movable coil 203 attract each other by the radial magnetic field generated by the magnet 202 and a magnetic field generated by the current flowing through the movable coil 203 in the opposite direction. The attraction of the magnetic fields generates a propulsion force for driving in a back lower direction of an arrow M3 in FIG. 5.

On the other hand, as shown in FIG. 5, the areas 203B1 and 203B2 (203B) in the movable coil 203 attract each other by the radial magnetic field generated by the side surfaces 202C1 and 202C2 (202C) of the magnet 202 and the magnetic field generated by the current flowing through the movable coil 203 in the opposite direction. The attraction of the magnetic fields generates a propulsion force for driving in a right upper direction of an arrow M4 in FIG. 5. Thus, the movable coil 203 is moved in a direction of an arrow M34.

As described above, the magnetic field generated by the movable coil 203 and the magnetic field generated by the magnet 202 have different directionalities for each of the areas 203A and 203B. At least one area 203B of the coil 203 having a Π-shaped section is placed to face the side surface 202C of the magnet 202, thereby providing an effect of constantly dispersing the generated propulsion forces having directionalities other than the driving direction irrespective of a current direction.

The dispersion of the propulsion forces inhibits prevention of driving the member to be driven (lens holding frame) 204 holding the movable lens, and blur of picked-up images caused by the member to be driven 204 holding the movable lens being lifted when the driving direction is reversed, described as the problems.

Also, generation of abnormal noise at the time can be effectively inhibited. Thus, in the embodiment, a lens drive apparatus (magnetic drive apparatus) is achieved that can perform satisfactory driving without a second yoke as compared with Japanese Patent Application Laid-Open No. 2002-169073.

As shown in FIG. 3, at least three surfaces of the magnet 202 produce open magnetic fields without a yoke member of magnetic material.

As described above, the lens drive apparatus of the embodiment includes the member to be driven 204 that holds the lens FL, can be moved in the optical axis direction, and is guided and supported in the lens barrel, and the movable coil 203 wound with at least the two sides 203B1 and 203B2 in parallel with the optical axis direction, and mounted to a part of the member to be driven 204.

The lens drive apparatus further includes the magnet 202 including the two areas 202A and 202B parallel to the optical axis direction, magnetized oppositely and placed adjacent to each other, placed to face the movable coil 203, and provided in a part of the lens barrel. The yoke 201 is provided that faces the magnet 202 and holds the magnet 202 with the movable coil 203 therebetween.

In the movable coil 203, at least one side of the two sides 203B1 and 203B2 faces one of the side surfaces 202C1 and 202C2, of the magnet 202, parallel to the direction of the optical axis La. Also, one side 203C other than the two sides 203B1 and 203B2 of the movable coil 203 faces the surface 202d parallel to the optical axis direction differently from the side surfaces 202C1 and 202C2 of the magnet 202.

As such, in the lens drive apparatus of the present invention, at least a part of the movable coil 203 mounted to the movable lens frame 204 is deformed so as to match or substantially match the side surface 202C of the magnet 202. The movable coil 203 is placed close to at least two surfaces of the magnet 202.

Thus, without a second yoke, prevention of driving the lens holding frame 204 caused by the propulsion force generated in a direction other than the optical axis direction is inhibited, the size of the apparatus is reduced, and the lens holding frame 204 is driven with high accuracy.

The present invention can be applied to a lens barrel included in an image pickup apparatus such as a digital camera or a video camera to allow a focusing or zooming movable lens frame to be driven with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-139166, filed May 28, 2008, which is hereby incorporated by reference herein in its entirety.

What is claimed is:

1. A lens barrel comprising:
   a lens holding member that holds a lens, and is movable in an optical axis direction;
   a coil being of a wound shape when projected on a plate parallel to the optical axis direction, and held on the holding member;
   a magnet held on the lens barrel and placed to face the coil in a direction perpendicular to the optical axis direction,
   wherein the magnet is of a flat plate shape including two areas parallel to the optical axis, which are magnetized oppositely and disposed adjacent to each other,
   wherein areas of the coil parallel to the optical axis are disposed to face side surfaces of the magnet, when a surface of the magnet disposed to face areas of the coil which are located in a fore/aft direction of the optical axis is defined as an upper surface of the magnet,
   wherein the upper surface and the side surfaces of the magnet are parallel to the optical axis, and
   wherein the magnet and the coil produce open magnetic fields.

2. The lens barrel according to claim 1, wherein there is no yoke being of a magnetic material on a side of the upper surface of the magnet in the direction perpendicular to the optical axis.

3. The lens barrel according to claim 1, wherein the areas of the coil parallel to the optical axis are disposed to face two surfaces of the magnet adjacent to the upper surface of the magnet.

4. The lens barrel according to claim 1, comprising a yoke disposed opposite to an opposite surface of the upper surfaces of the magnet in the direction perpendicular to the optical axis.

5. An image pickup apparatus comprising the lens barrel according to claim 1.

* * * * *